Feb. 18, 1969

E. BALL 3,428,507

METHOD OF MAKING A HOSE PIPE OF HELICALLY WOUND STRIPS OF THERMOPLASTIC MATERIAL

Filed May 18, 1965

INVENTOR
Eric Ball

By
Watson, Cole, Grindle & Watson
ATTORNEYS

Feb. 18, 1969  E. BALL  3,428,507
METHOD OF MAKING A HOSE PIPE OF HELICALLY
WOUND STRIPS OF THERMOPLASTIC MATERIAL
Filed May 18, 1965  Sheet 2 of 4

INVENTOR
Eric Ball

BY
Watson, Cole, Grindle & Watson
ATTORNEYS

Inventor
Eric Ball
By
Watson, Cole, Grindle & Watson
Attorneys

INVENTOR
Eric Ball
By
Watson, Cole, Grindle & Watson
ATTORNEYS

United States Patent Office 3,428,507
Patented Feb. 18, 1969

3,428,507
METHOD OF MAKING A HOSE PIPE OF HELICALLY WOUND STRIPS OF THERMOPLASTIC MATERIAL
Eric Ball, Melton Park, Newcastle-upon-Tyne, England, assignor to George Angus & Company Limited, Newcastle-upon-Tyne, England, a company of England
Filed May 18, 1965, Ser. No. 456,707
Claims priority, application Great Britain, May 20, 1964, 20,822/64
U.S. Cl. 156—188        6 Claims
Int. Cl. B65h 81/08; F16i 11/08

ABSTRACT OF THE DISCLOSURE

A hose pipe comprising an inner tube, strips of thermoplastic material wound about said tube and a cover about said strips of material. Each strip includes spaced, parallel reinforcing filaments which extend in the longitudinal direction and have been embedded in the thermoplastic material under heat and pressure. The filaments are spaced in each strip by at least half the diameter of the filaments and the ratio by weight of polymeric material to filamentary material in each strip is at least three-to-one with half of the strips being wound left-handed and the other half right-handed. The strips are thereafter bonded together and to the inner tube.

---

This invention relates to the manufacture of hose pipes, suitable for use as suction or delivery hose, of the type comprising a body of polymeric material, such for example as natural or synthetic rubber or polyvinyl chloride, which is thermoplastic in the uncured or unvulcanised condition, said body containing a reinforcement constituted by textile yarns or flexible wires, for example of metal.

It is known to use in such hose pipes a reinforcement of woven fabric, which has been rubber-frictioned or impregnated with a solution or paste of rubber or polymer so as to permit of adhesion of successively applied plies of the fabric.

It is also known to reinforce the hose by means of individual strands of textile yarn or wire positioned by braiding, knitting or spiral lapping. In these cases either the yarns are pre-treated to permit bonding or must be impregnated with rubber or polymer solution at the time of application of the yarn to the hose. The use of such solutions represents an excess cost, since the solvent evaporates and is lost. Nevertheless since the polymeric components of the hose are cold at the time the yarn or wire is applied to them in making the hose, they are not self adherent to the strands and a costly solution treatment is, therefore, necessary. When individual strands are applied to the hose form a reinforcement, these must be contained on relatively small bobbins, spools or cheeses to operate with braiding or lapping machines, the process requiring that a large number of such bobbins be rotated about the hose to form the reinforcement.

It is also known to employ as the reinforcement a fabric, known as "tyre-cord," which fabric consists of a warp of parallel textile cabled strands, woven with a very thin and widely-spaced weft yarn which serves to hold the warp yarns in substantially parallel relationship during processing but contributes insignificant strength to the reinforcement. Such "tyre-cord" must be treated in the same way as a fabric, and gum-dipped, frictioned with rubber, or otherwise impregnated with polymeric paste or solution so that it subsequently adheres to and becomes bonded to the other components of the hose.

Woven fabrics, and "tyre-cord," after appropriate adhesive treatment, are usually applied to the hose to form a reinforcement by cutting into strips of suitable width and wrapping in a helical formation. This may be performed in a number of ways, the strips for example being cut "on the bias," rejoined together and applied by straight wrapping. Alternatively the strips may be cut parallel to the warp yarns and rolled into coils, which are rotated by suitable means round an axis along which the partially-built hose is progressed, so that the strips are wrapped helically round the hose at a chosen angle, successive layers being applied in opposite senses to form a balanced reinforcement.

The invention provides a hose pipe suitable for use as a suction or delivery hose, which includes an even number of helically wound strips of thermoplastic polymeric material each containing parallel, reinforcing filaments which extend in the longitudinal direction only of the strips, the strips being bonded together and half of them being wound left handed and the other being wound right handed.

The present invention also provides a method of manufacturing such a hose pipe which includes the steps of feeding a ribbon of parallel filaments into a calender in which the filaments, while remaining parallel, are embedded under heat and pressure in a sheet of the polymeric material, winding the resulting sheet material (with preliminary slitting into narrower strips if necessary) in helical formation around a mandrel in a number of superposed layers in opposite senses and subsequently curing or vulcanising the resultant assembly to effect adhesion between the layers.

The constituent plies of which the body of the hose is built up thus contain reinforcing filaments which extend in one direction only, there being no wefts. The strip material utilized for the plies may be made as follows:

A static creel able to support large bobbins or spools of filamentary material is arranged, with appropriate tensioning and guiding means, to feed a parallel ribbon of filaments into a calender adapted to produce a uniform sheet of the required polymeric material, in which the filaments are embedded while maintaining their parallel relationship. If desired, the sheet may have an unreinforced edge. This may be achieved with, for example, a 3-bowl calender producing continuously a sheet from one pair of bowls and one nip, the ribbon being fed into the second nip and the filaments thus being embedded. It is, however, preferred to employ a 4-bowl calender producing two independent sheets of polymeric material between which the ribbon is introduced, the resulting "sandwich" being compacted into a fully embedded matrix at the third nip. Wide strip produced in this way can subsequently be split into narrower widths as required for hose of differing diameter, and coiled up for subsequent use.

The invention will now be described in detail, by way of example, with reference to the accompanying drawings in which:

FIGS. 1A and 1B are diagrams illustrating the fabrication on a three bowl calender of ply material for use in building a hose according to the invention, FIG. 2 is a perspective view showing the manufacture of ply material on a four bowl calender, FIG. 3 is a side elevation of a machine for making the hose, FIGS. 4A–4D are diagrammatic sectional views of typical forms of ply material for use in accordance with the invention, FIGS. 5A–5C are diagrammatic perspective views showing successive stages in the building of a hose, FIG. 6 is a similar view showing an alternative method of building a hose, FIGS. 7A and 7B show alternative forms of hose using the ply material shown in FIG. 4A, FIGS. 8A and 8B show alternative forms of hose using the ply materials shown in FIG. 4B, FIGS. 9A and 9B show hoses using the ply materials shown in FIGS. 4C and 4D, FIG. 10 shows the building of a hose from the ply material shown in FIG. 4D, FIG. 11 illustrates, in perspective and partly in section, a delivery hose in accordance with the invention, FIG. 12 illustrates, in perspective and partly in section, a suction hose in accordance with the invention, and FIG. 13 is a section through part of an oil suction and delivery hose in accordance with the invention.

Like reference numerals indicate like parts throughout the figures.

The first stage in the manufacture of the hose consists in the production of strip material, consisting of parallel textile or wire filaments embedded in polymeric material. Examples of such strip materials are shown in FIGS. 4A–4D and their manufacture will be described below with reference to FIGS. 1A and 1B and with reference to FIG. 2. The strip material, normally after slitting to the desired width, is then coiled to form a hose, together with layers of such other materials as may be required, on a machine of the kind shown in FIG. 3. Afterwards the hose is wrapped in conventional manner with textile material (e.g. woven cotton or nylon tape) and subjected to vulcanisation or curing in a steam chamber. These last two steps being conventional are not illustrated.

FIGS. 1A and 1B illustrate the formation of strip material on a three bowl calender which includes calender rolls 10, 11, 12, which rotate in the direction shown by the arrows. Rubber 13 fed into the nip between the rolls 10, 11 is calendered to form a strip 14 on a liner sheet 15, e.g. of textile material, which is drawn from a pay-off roll 16 and serves to prevent adhesion of successive convolutions of the rubber strip 14 as it is coiled on a take up roll 17. The material coiled on the roll 17 is then passed again through the calender, as shown in FIG. 1B, being drawn from a payoff roll 18 and fed to the nip between the rolls 11, 12. Rubber 13A fed to the nip between the rolls 10, 11 is calendered to form a rubber strip 14A. Filaments 19 of textile material or wire are drawn from bobbins and passed, through a reed 21 and a spacing roll 22, to the nip between the rolls 11, 12 between the rubber strip 14A and the material supplied from the payoff roll 18. The resulting laminate is coiled on a take-up roll 23, being slit to the desired width by slitting knives 24. If desired, the liner 15 may be omitted and the strips 14, 14A of rubber may be dusted with chalk or zinc stearate to prevent them from adhering together when coiled on the take-up rolls 17, 23.

FIG. 2 shows an alternative procedure in which four calender rolls 10A, 11A, 12A and 25 are used. Rubber is fed at 13B and 13C to the nips between the rolls 10A and 25 and between the rolls 11A and 12A and is calendered to form two rubber strips 14B, 14C. The filaments are fed, through tensioning rolls 26 and a separating comb 27 to the nip between the rolls 10A and 11A, the resulting laminate 28 passing under a pressure roller 29 and then under a trimming knife 30 as it traverses the roll 10A. The laminate 28 may be dusted with zinc stearate and coiled up without a liner. Alternatively, a liner may be applied to the laminate at any convenient point between the calender and the take up roll (not shown).

While reference has been to rubber, it will be appreciated that other polymeric materials may be calendered on to the filaments, that the polymeric materials supplied to the three bowl calender at stages 1 and 2, shown in FIGS. 1A and 1B, or to the four bowl calender at 13B and 13C in FIG. 2, may be the same or different, and that the thicknesses of the layers of polymeric material above and below the filaments may be the same or different.

Typical examples of strip materials so produced are shown in FIGS. 4A–4D. In these figures the upper surface of the strip is shown flat but in practice it is often corrugated notwithstanding the use of smooth calender rolls, because of the resilient nature of the polymeric material which, particularly in thin layers, appears to compress to a different extent over the filaments, where it is thinner, as compared with between the filaments. In the case of the strips shown in FIGS. 4B–4D, the filaments 19 do not extend to the edge of the strip, a plain rubber edge 31 being provided. The thickness of the individual sheets of rubber or other polymeric material contained in the strip may vary from 0.005–0.0125 inch and the total thickness of the strip from 0.010–0.025 inch. The filaments should have a minimum breaking strength of 0.5 lb.

Ordinarily the minimum clear space between adjacent filaments should be at least one-half the diameter of the filaments. Since the filaments are not, in general, given any pre-treatment to assist in bonding their surfaces to the polymeric material it is necessary for sufficient polymeric material to be present between the filaments to bond firmly the layers of polymer on opposite sides of the row of filaments. The ratio by weight of polymer and filament material in a strip will generally be at least 3:1.

The hose is built up by winding helically on a mandrel a number of strips of the constructions just described in opposite senses so as to provide a balanced construction. The mandrel may carry an extruded tube of polymeric material which will constitute the inner layer of the hose and the hose will normally include an outer cover of un-reinforced polymeric material which may also be applied as a helical winding. The inner tube can, however, be dispensed with if the innermost strip of reinforced polymeric material contains a sufficient thickness of polymeric material below the reinforcing yarns or wires, to ensure that this extra layer of polymeric material will flow together, upon curing or vulcanisation, to form an impermeable inner tube. Similarly, the outer polymeric cover can be dispensed with if the outermost strip contains a sufficient thickness of polymeric material above the reinforcing filaments. The inner tube and outer cover can also be dispensed with by using to form the innermost and outermost layers of the hose thinner strips having an unreinforced edge.

Each strip is normally so wound that the edges of successive convolutions touch one another, but a slight gap, e.g. of the order of 1/16", may be left between these edges. Any large gap would create sources of local weakness in the hose and, except when a strip with an unreinforced edge is wound to form an inner tube or an outer cover, any substantial overlap should be avoided, because the resultant local increase in wall thickness of the hose at such overlaps would tend to cause the cover material to be forced away from these points during curing, leaving the reinforcing filaments too near the outer surface of the hose.

Where the hose is to be used as a suction hose, it will include one or more helices of wire. Thus a helix of wire may be wound on the mandrel prior to application of the inner extruded tube. Alternatively, to make a hose with an embedded helix of wire, the procedure may be to apply to the mandrel first the inner tube, then two opposing layers of reinforcement strip, then the helix of wire, then perhaps another pair of layers of reinforcement strip, and finally the cover. In a simpler version of a fully embedded suction hose, it is possible to use the sequence-tube, one single layer of reinforcing strip, say clockwise, a helical wire armouring, another single layer of reinforcing strip anticlockwise, and finally the cover.

This method of manufacture thus eliminates the use of solvent-based adhesive cements and of weft yarns in the reinforcement, and takes advantage of the fact that the individual filaments can be embedded in the polymeric material under heat and pressure by a calendering operation.

The filaments can be dispensed from a static creel owing to the inter-position of the calendering and strip forming process before hose making. Thus very large bobbins, received direct from the yarn or wire manufacturers can be employed. This avoids the considerable cost of re-winding the filaments onto smaller packages suitable for braiding and like machines.

Building of the hose can be carried out on a machine running at a speed, e.g. 240 r.p.m., considerably higher than that of a conventional braiding or lapping machine. The coils of strip to be wound helically around the mandrel need not be numerous. Thus if a hose with four layers of strip, two clockwise and two anti-clockwise, is to be made, there will be only four rotating heads, each head carrying a coil of strip material. The size of the coil of strip can be chosen at will, and would normally be sufficient in length to make perhaps one hose on a 60 ft. mandrel, thus being say, from 6″ to 18″ in diameter. The width of the coil of strip will depend on the diameter of the mandrel being used, it being assumed that the angle of wrap is round about 55°. The actual width may vary from two or three inches for a small hose to ten or twelve inches for a large hose. A coil of strip material of these dimensions is compact and can be rotationally mounted on a strong axle, carried by an arm with an effective radius of only, say, 2 ft. Moreover this arm can be approximately counter-balanced. The resulting assembly will withstand considerable centrifugal forces and can therefore be rotated at high speed.

FIGS. 5A–5C illustrate successive stages in the manufacture of a hose. An extruded rubber tube 32 is first applied to a mandrel 33. A reinforced strip 28 is then wound around the tube 32 with right hand rotation and then a second reinforced strip 28A is applied with left hand rotation. If desired, the tube 32 may be formed by lapping a rubber strip around the tube. A typical machine for carrying out this operation is shown in FIG. 3, the strip 28 being applied by a lapping head 34 with right hand rotation and the strip 28A by a lapping head 35 with left hand rotation and the hose being drawn off the mandrel by a take up drum 36.

The lapped layers may exceed two and will normally be lapped in alternate directions. However, in the case of hoses containing four laps, or a multiple of four laps, they may be applied in pairs as shown in FIG. 6, the first and second laps 28, 28A being left handed and the third and fourth laps 28B, 28C being right handed.

FIG. 7A illustrates how the strip shown in FIG. 4A, which has a thick layer of rubber beneath the filaments, can be lapped to form an inner tube 32A, the thick layer of rubber being in contact with the mandrel 33.

FIG. 7B illustrates how the strip shown in FIG. 4A can be lapped to form a cover 37 around a hose 38 produced by lapping strip material around a mandrel 33. In this case the thick layer in the strip 28 forming the cover faces outwardly.

FIG. 11 shows a delivery hose having an internal diameter of 2 inches and constituted by:

Figure 1A:
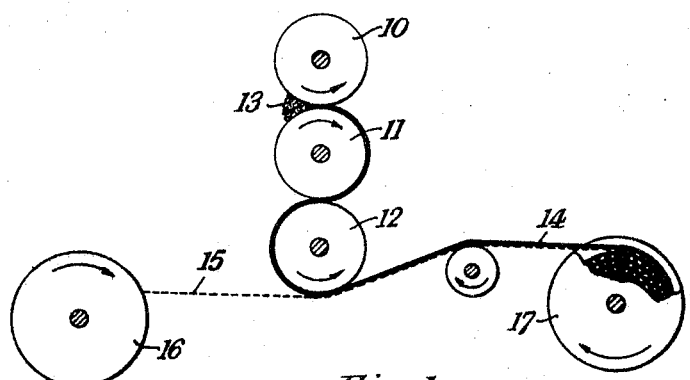
Figure 1B:
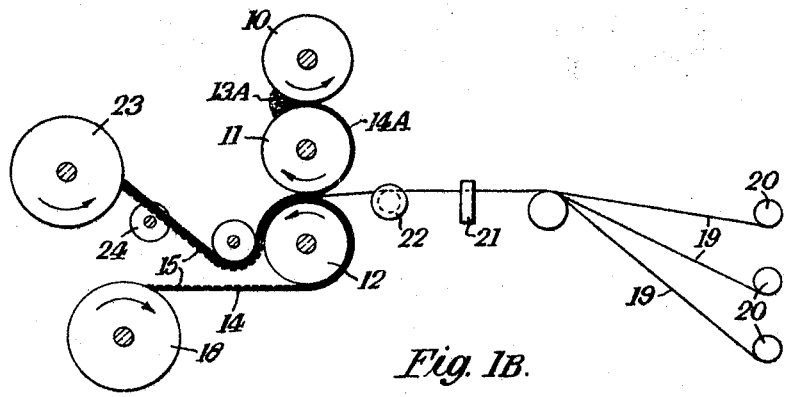
Figure 2:
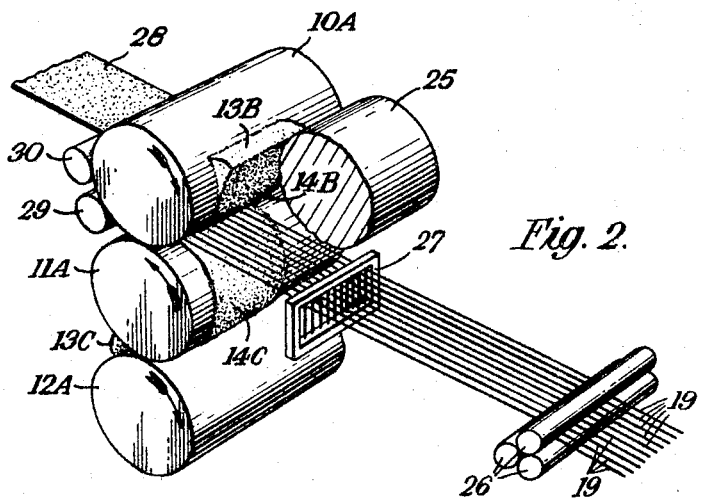
Figure 3:
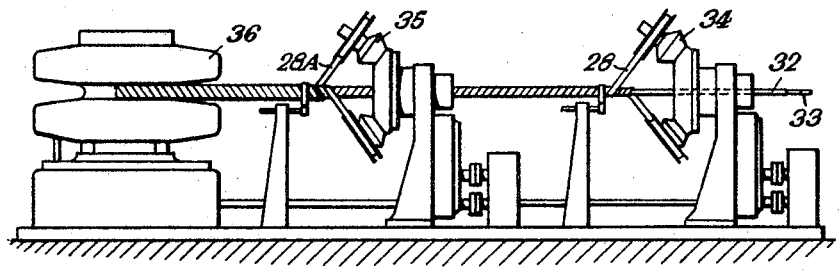
Figure 4A:
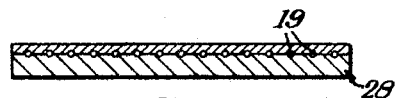
Figure 4B:
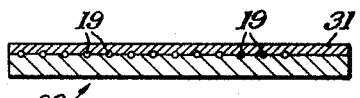
Figure 4C:
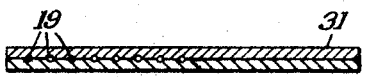
Figure 4D:
Figure 5A:
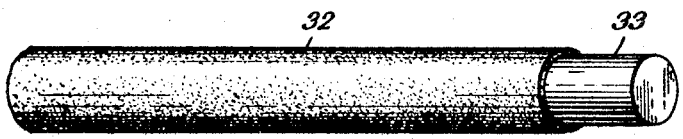
Figure 5B:
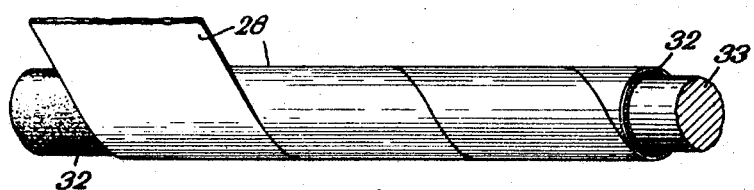
Figure 5C:
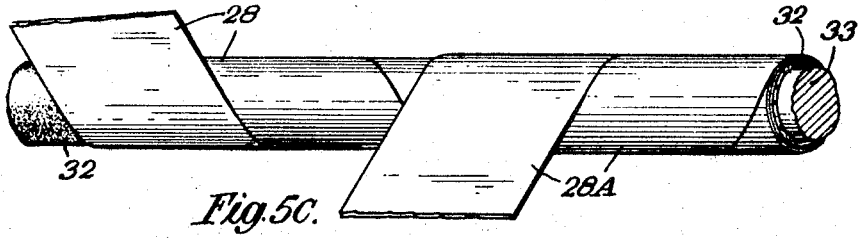
Figure 6:
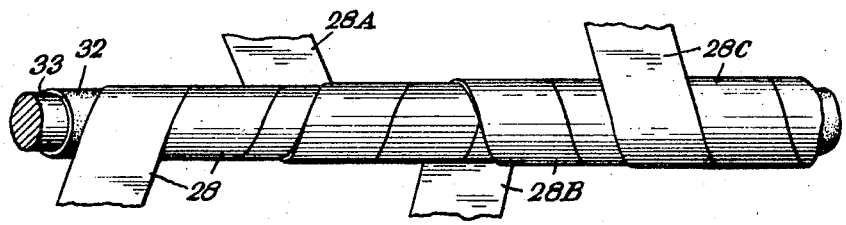
Figure 7A:
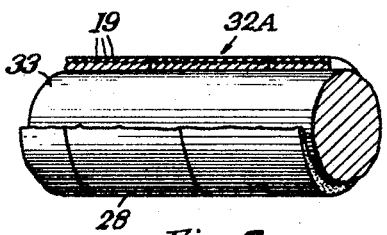
Figure 7B:
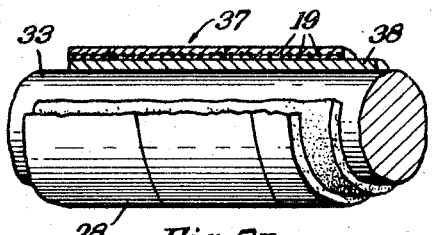
Figure 8A:
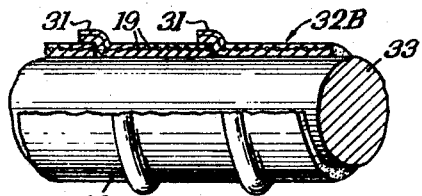
FIG. 8A illustrates how the strip shown in FIG. 4B can be lapped to form an inner tube 32B, with the unreinforced edge 31 of each convolution partly overlapping the reinforced portion of the next convolution.
Figure 8B:
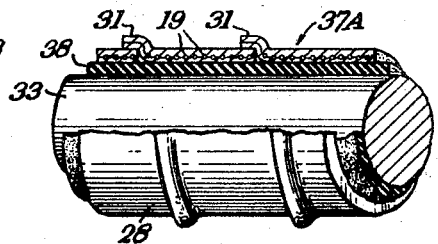
FIG. 8B illustrates the use of the strip shown in FIG. 4B to form an outer cover 37A on a hose 38, the strip again being wound with its unreinforced edge partly overlapping.
Figure 9A:
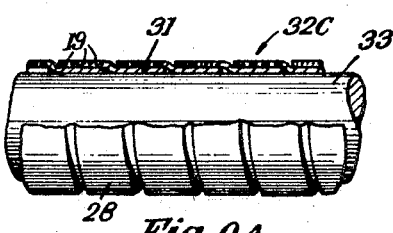
FIG. 9A illustrates the use of the strip shown in FIG. 4C to form a tube 32C. In this case the reinforced portion of the strip, which is of the same width as the unreinforced portion 31, completely overlaps the unreinforced portion.
Figure 9B:
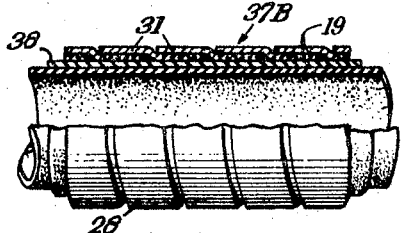
FIG. 9B illustrates the use of the same strip to form a cover 37B for a hose 38. In this case the unreinforced portion 31 completely overlaps the reinforced portion of the strip.
Figure 10:
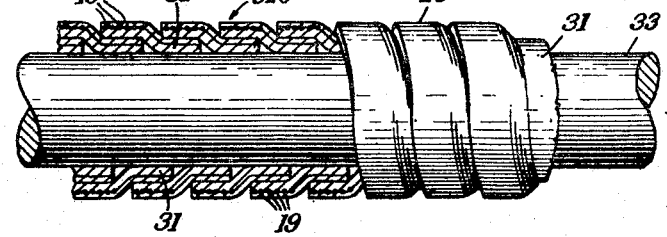
FIG. 10 shows the use of the thicker strip of FIG. 4D to form a tube 32C, with complete overlap of the unreinforced part of the strip as in FIG. 9A.
Figure 11:
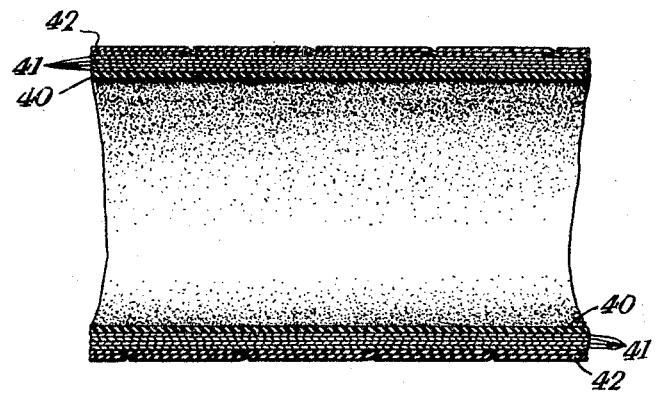

(a) An inner extruded rubber tube 40 of thickness 0.078 inch.

(b) Four layers 41 of strip material comprising 4 ply 1650 denier filament rayon yarns (8 yarns per inch width) embedded between two rubber sheets each having a thickness of 0.0155 inch. These layers are either lapped alternately, LH, RH, LH, RH or lapped LH, LH, RH, RH. (LH representing left hand and RH right hand).

(c) A cover 42 constituted by a rubber cover, of thickness 0.080 inch, applied by winding spirally, with 50% overlap, a calendered rubber strip having a thickness of 0.040 inch.

Figure 12:
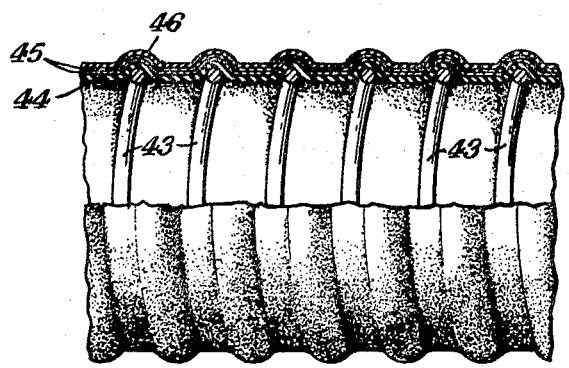

FIG. 12 shows a semi-embedded suction hose having an internal diameter of 2 inches and constituted by:

(a) A wire armouring 43 of galvanised steel wire of 11 SWG pre-spun to a helix having a pitch of ⅝ inch.

(b) A lining 44 of lapped rubber sheet having a thickness of 0.072 inch.

(c) Two layers 45 of strip material comprising 2 ply 1650 denier filament rayon yarns (8 yarns per inch width) embedded between two rubber sheets each having a thickness of 0.015 inch, one layer being lapped left handedly and the other right handedly.

(d) A cover of calendered rubber sheet of thickness 0.022 inch. The hose assumes its corrugated form during vulcanisation.

Figure 13:
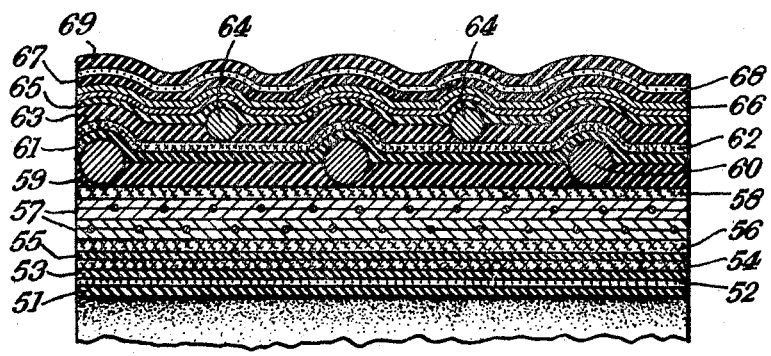

The oil suction and delivery hose shown in FIG. 13 has an internal diameter of 8″ and is of the following constitution:

51—Lining Part 1: Synthetic rubber sheet of thickness 0.048 inch.
52—Breaker ply: Leno fabric treated with synthetic rubber 0.034 inch thick.
53—Lining Part 2: Synthetic rubber sheet of thickness 0.048 inch.
54—Second breaker: Woven cotton fabric treated with synthetic rubber 0.030 inch thick.
55—Safety sheet: Synthetic rubber of thickness 0.032 inch.
56—Base ply: Woven cotton fabric treated with synthetic rubber and of thickness 0.045 inch.
57—Two layers of strip lapped one left handedly and the other right handedly comprising high tensile steel stranded wires embedded (5 wires per 1″ width) between two rubber sheets each 0.040 inch thick (wire is 250 lbs. tensile strength brass plated steel 6 x 0.012 inch diameter wires around a core of 3 x 0.0059 inch diameter wires.
58—Fabric ply: Fabric treated with rubber and 0.045 inch thick.
59—Embedding sheet: Rubber of thickness 0.096 inch.
60—1st wire helix: 6 SWG (0.192 inch diameter) galvanised steel wire applied at 1 inch pitch.
61—Embedding sheet: Rubber of thickness 0.048 inch.
62—Interwire ply: Fabric treated with rubber and 0.055 inch thick.
63—Embedding sheet: Rubber of thickness 0.064 inch.
64—2nd wire helix: 10 SWG (0.128 inch diameter) steel wire applied at 1 inch pitch and at ½ inch pitch from 1st wire helix.
65—Embedding sheet: Rubber of thickness 0.032 inch.
66—Cover plies: Two plies of fabric treated with synthetic rubber and each of thickness 0.034 inch.
67—Cover Part 1: Synthetic rubber of thickness 0.045 inch.
68—Breaker: Fabric treated with synthetic rubber and of thickness 0.034 inch.
69—Cover Part 2: Synthetic rubber of thickness 0.045 inch.

It is possible by the method according to the invention, drawing fine flexible high-tensile steel wires or small cables from a static creel and embedding these in the polymeric matrix strip, to construct large diameter strong hoses, (e.g. for oil discharge purposes) which may be of substantial diameter (e.g. 12″). The total number of reinforcing wires would in this case amount to several hundred and these are readily laid on as embedded strips. It would be impossible to apply such a hose reinforcement by any other means, since braiding or spiraling lapping machines are incapable of rotating several hundred individual bobbins of wire round a hose of large diameter.

What I claim as my invention and desire to secure by Letters Patent is:

1. A method of manufacturing a hose pipe, suitable for use as a suction or delivery hose, which comprises winding an even number of strips of thermoplastic polymeric material helically around an impermeable inner tube of thermoplastic polymeric material, each said strip including spaced parallel reinforcing filaments which extend in the longitudinal direction and which have been embedded in said thermoplastic material strips under heat and pressure, said filaments being spaced in each said strip by at least half the diameter of said filaments, and a ratio by weight of polymeric material to filamentary material in each said strip being at least three-to-one, and half of said strips being wound left-handed and the other half right-handed, and thereafter binding said strips together and to said inner tube.

2. The method of manufacturing a hose pipe as in claim 1, wherein said inner tube is an extruded tube.

3. The method of manufacturing a hose pipe as in claim 1, wherein said inner tube is made by helically winding a second strip of thermoplastic polymeric material, reinforced by parallel filaments which extend in the longitudinal direction only and have an unreinforced edge, said unreinforced edge forming the inner wall of said hose pipe and being over-lapped by the reinforced portion of said second strip.

4. The method of manufacturing a hose pipe as in claim 1, further characterized by placing an outer cover of thermoplastic polymeric material about said first strips.

5. The method of manufacturing a hose pipe as in claim 1, further characterized by helically winding an outer strip of unreinforced thermoplastic polymeric material about said first strips.

6. The method of manufacturing a hose pipe as in claim 1, further characterized by helically winding an outer cover about said first strips, said cover comprising a third strip of thermoplastic polymer material reinforced by parallel filaments which extend in the longitudinal direction only and have an unreinforced edge, said unreinforced edge facing the exterior of said hose pipe and over-lapping the reinforced portion of said third strip.

References Cited

UNITED STATES PATENTS

| | | | |
|---|---|---|---|
| 2,156,899 | 5/1939 | Pierce | 156—144 |
| 2,913,011 | 11/1959 | Noyes et al. | 156—144 XR |
| 1,742,777 | 1/1930 | Midgley | 156—437 XR |
| 2,512,762 | 6/1950 | Benson et al. | 156—437 |

PHILIP DIER, *Primary Examiner.*

U.S. Cl. X.R.

156—231, 437, 195; 138—133